United States Patent

[11] 3,575,140

| [72] | Inventor | Imre Prepeliczay |
| | | 2994 E. 126 St., Cleveland, Ohio 44120 |
| [21] | Appl. No. | 842,495 |
| [22] | Filed | July 17, 1969 |
| [45] | Patented | Apr. 20, 1971 |

[54] ANIMAL REFUSE CONTAINER
4 Claims, 4 Drawing Figs.

[52] U.S. Cl................................................. 119/1, 4/142
[51] Int. Cl..................................................... A01k 29/00
[50] Field of Search........................................ 4/99, 111, 1, 138, 142; 119/1

[56] References Cited
UNITED STATES PATENTS
1,061,879  5/1913  Sprint........................... 4/138
3,428,967  2/1969  Hughes.......................... 4/142

Primary Examiner—Hugh R. Chamblee
Attorney—Oberlin, Maky, Donnelly & Renner

ABSTRACT: A container adapted for insertion in a ground cavity so that the top portion thereof is substantially at ground level, including a grate forming a lid for the container and for securing a removable plastic liner therein. A hollow cylinder is mounted on the grate acting as a support for a manually swingable cover plate and as a receptacle for an animal attracting substance. The plastic liner within the container may be partially filled with a deodorizing and waste disintegrating chemical and the liner may be readily removed for disposal purposes.

PATENTED APR 20 1971 3,575,140

INVENTOR.
IMRE PREPELICZAY
BY
Oberlin, Maky, Donnelly & Renner
ATTORNEYS

ANIMAL REFUSE CONTAINER

This invention relates to hygienic apparatus and more particularly to apparatus suitable for the inducement and retention of animal body eliminations which is especially suitable in metropolitan areas where such nuisances must be attended to for reasons of sanitation.

The problem of animal sanitation is of interest not only to animal owners but also to apartment complex managers and metropolitan sanitation departments and various attempts have been made in the past to control such sanitation problems including the passage of municipal laws and regulations regarding the harboring and care of animals. Even the rural property owner is inconvenienced at times with the sanitation problem and it would be beneficial to have some form of apparatus which would aid significantly in inducing animals to utilize a specified area and to facilitate the disposal of refuse while achieving the objects of eliminating a health hazard and making the sharing of common available space more compatible for apartment dwellers and the like.

Such refuse apparatus is of course of no value if there is inconvenience on the part of the animal owner in training his animal to utilize such apparatus or in disposing of the refuse. Therefore, it is incumbent that such apparatus be conveniently located for utilization, be convenient to operate by the animal owner and provide the built-in inducement to the animal as well as facilitate the refuse disposal.

The apparatus of the invention is especially suited for adaptation to such sanitation purposes being adaptable for in ground use or may be modified to be used within a dwelling. As such, the apparatus will find application in serving not only the dwellers of an apartment dwelling, for example, but also individual home owners.

Figure 1:
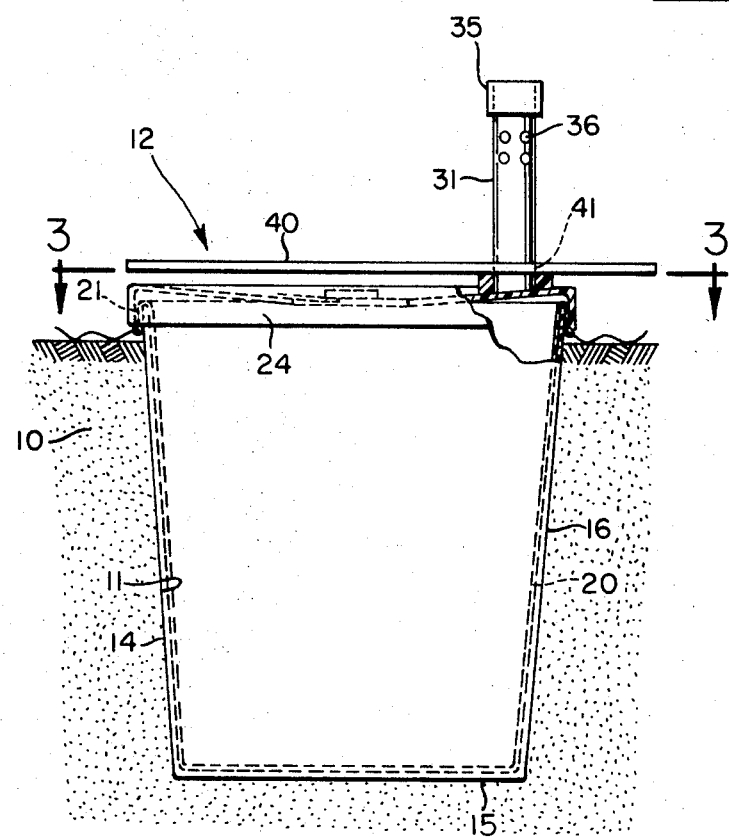
FIG. 1 is an elevational view of the apparatus of the invention shown in typical environment in an earth cavity.

Referring now to the FIG. 1 environmental showing of the application, there is shown a portion of the earth 10 in cross section having a cavity 11 for receipt of the apparatus of the invention 12. It is clear that such showing is but one typical environment for the invention and that modifications in the dimensions of same may be effected, while still within the teachings of the invention, so that the apparatus may be utilized in different environments, for example, in the interior of a dwelling.

The animal refuse apparatus 12 comprises a container 14 of generally cylindrical configuration having a bottom surface 15 and a gently upwardly sloping sidewall 16 formed of relatively thin plastic material, for example, although any other suitable type of material may be employed. The container 14 is received within the cavity 11 but includes an open end 18 protruding slightly above the surface of the earth 10. Preferably the container 14 is of suitable depth to accommodate a relatively large quantity of animal refuse, but as will be pointed out hereinafter, such dimension may be varied as when the apparatus 12 is to be employed in a dwelling or when a large number of animals are to be accommodated.

A plastic bag or liner is depicted by the dashed line 20 as lying inside substantially the full interior surface of the container 14 and conforming generally in shape to such container, but of a sufficiently greater depth so that the free end 21 of the bag 20 may be folded back over the open end 18 of the container 14. The free end 21 of the bag 20 is threaded with a drawstring 22 so that the free end 21 may be snugly secured to the open end 18 of the container 14, such securement being facilitated by the slightly sloping side 16 of the container.

The plastic bag 20 is adapted for removal from the container 14 for disposal of the animal refuse, the drawstring 22 being provided to securely close the open end 21 of the bag.

A cover 24 is provided for substantially closing the open end 18 of the container 14, said cover 24 comprising a top surface 25 of generally inverted, conical configuration, formed preferably of plastic material and having a depending flange 26 about its periphery for engaging the sidewall 16 of the container 14. The cover 24 further includes an aperture 28 at the central portion thereof for receipt of the animal refuse, the aperture 28 being partly closed by a small disc 29 of plastic material supported on a plurality of webs 30, thereby forming a grate which allows the entrance of animal refuse into the interior of the container 14 but prevents larger objects from falling therein.

Figure 2:
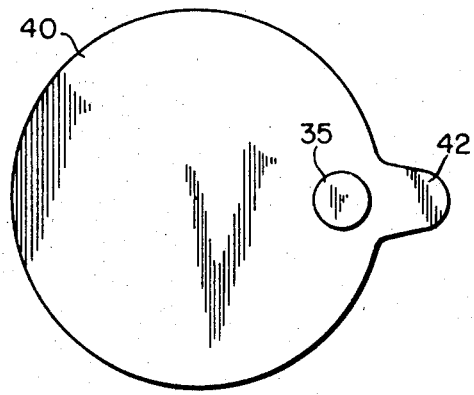
FIG. 2 is a plan view of the apparatus showing primarily the cover member.
Figure 3:
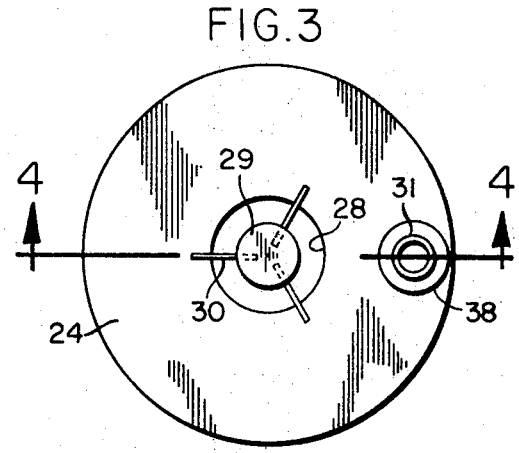
FIG. 3 is a view taken along the lines 3—3 of FIG. 1 showing in plan view the grate and cover portion of the invention.
Figure 4:
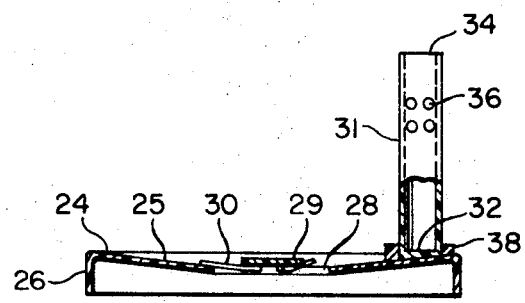
FIG. 4 is a cross-sectional view of the grate taken along the lines 4—4 of FIG. 3.

Further mounted on the cover 24 at an eccentric location thereon, and near the outside flange 26, is a post 31 of hollow, cylindrical configuration, extending vertically upwardly from the cover 24. The post 31 has a closed bottom end 32 or such bottom may be formed by abutment with the cover 24, but as noted in FIG. 4, the lower portion of the post is slightly angled to conform to the conical surface 25 of the cover 24.

The post 31 further includes an open upper end 34 for receipt of a chemical substance therein, the upper end 34 receiving also a cap 35 for closing the interior of the post. The post 31 also includes a plurality of perforations 36 near the upper end thereof for ventilation of the chemical substance container therein.

A washer 38 is mounted about the lower portion of the post 31, said washer 38 having a substantially horizontal top surface and an angled bottom surface to conform to the conical surface 25 of the cover 24.

The refuse container 12 further includes a shield 40 or cover comprising a flat plate of generally circular configuration of sufficient area to completely overlie the grate cover member 24 to prevent the entrance of rainfall, leaves and general yard debris. The shield 40 includes an aperture 41 near the periphery thereof corresponding in size to the diameter of the post 31 and the shield 40 is adapted for mounting on the post 31, being supported by the top surface of the collar 38. The collar 38 therefore provides a means of spacing the shield 40 slightly above the top surface 25 of the cover 24 for freely pivotable movement thereover, such movement being facilitated by the protrusion of an ear 42 on the shield extending radially outwardly from behind the aperture 41 location. The ear 42 is adapted to be manually grasped for pivoting the shield 40 from over the top surface 25 of the cover 24 and for a return to the shielding position as indicated in FIG. 1.

As previously indicated both the post 31 and the container 14 are adapted for receipt of chemical compounds which provide an inducement for the use of the refuse container. A compound providing an attractive scent for animals as well as a deodorizing function may be contained within the post 31, ventilation being provided by the perforations 36 therein. The compound in the bag 20 in the container 14 may be of a slightly different characteristic providing some deodorizing function but primarily acting as a sanitizing agent and decomposing chemical. Both compounds are commercially available items and are introduced to the apparatus 12 at desired intervals and are protected from the elements by the cap 35 on the post 31 and the shield member 40 for the container 14, respectively.

While the preferred embodiment of the invention is shown in a ground cavity 11 environment, it will be appreciated that the apparatus of the invention 12 is utilizable as well when situated on the surface of the ground 10 or the floor of a dwelling. In such latter environments the only variation which need be made in the form of apparatus 12 depicted is a modification of the sidewall 16 or depth of the container 14 as well as of the plastic liner 20 so that the top surface 25 of the grate 24 is only a few inches above ground level, but still conveniently usable as a refuse container.

Further, it should be noted that the apparatus 12 is of utmost convenience to the animal owner. Day to day utilization requires only a swinging of the shield 40 about the post 31, while for cleaning purposes the post 31 may be manually grasped to lift off the cover 24 and shield 40 simultaneously for removal of the bag 20. When a fresh bag 20 is inserted, the cover 24 is replaced on the container 14 securing the bag 20 between the flange 26 and the open end 18 of the container 14 with the draw string 22 lying beneath the flange 26.

Although a cylindrical container 14 has been described it will be clear that other shapes are utilizable as well, within the teachings of this invention. Thus, the container 14 may be more boxlike, having a square or rectangular cross section, with a corresponding modification of cooperating parts, such as the cover 24 and shield 40.

I claim:

1. Apparatus for receipt and storage of animal refuse comprising a container of thin wall construction having an open upper end and enclosing side and bottom walls, a cover for closure of the open end of said container, said cover having a top surface and a flange depending from said top surface, said flange adapted to lie closely adjacent the outside periphery of the sidewall of said container for retaining said cover in place, said top surface being apertured for receipt of animal refuse into the interior of said container, a post eccentrically mounted on said cover, said post extending generally vertically and upwardly of said cover and adapted to be grasped for placement of said cover with respect to said container, a shield pivotally mounted on said post, said shield comprising a flat member having a shape corresponding to the profile of the open end of said container and adapted to be pivoted about said post to overlie said cover in one position and to substantially expose said cover in another position, a plastic liner adapted to closely overlie and seal the interior surface of said container, said liner having an open end adapted to be folded back over the upper end of said container and to be clamped by said flange of said cover, and a support member mounted on said cover at the base of said post for support of said shield a short distance above said cover, thereby to allow ventilation of said container.

2. Apparatus as set forth in claim 1 wherein said plastic liner comprises a bag having a drawstring threaded at the open end thereof for securement of said bag on said container and for closure of said bag upon removal from said container, said drawstring being adapted to underlie the flange of said cover when said cover is mounted on said container.

3. Apparatus as set forth in claim 1 wherein said post comprises a hollow cylindrical member and a cap for closure of the upper end thereof, said hollow member including perforations therein and adapted for receipt of an animal attraction substance, ventilation being afforded through such perforations.

4. Apparatus as set forth in claim 3 wherein said container, said cover and said shield are of generally circular cross section and said container is adapted for insertion in a ground cavity so that said cover is substantially at ground level.